United States Patent
Wyland (10) Patent No.: US 10,048,357 B2
(45) Date of Patent: Aug. 14, 2018

(54) TIME-OF-FLIGHT (TOF) SYSTEM CALIBRATION

(71) Applicant: MICROSOFT TECHNOLOGY LICENSING, LLC, Redmond, WA (US)

(72) Inventor: David Wyland, Morgan Hill, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 226 days.

(21) Appl. No.: 14/740,049

(22) Filed: Jun. 15, 2015

(65) Prior Publication Data

US 2016/0363654 A1    Dec. 15, 2016

(51) Int. Cl.
| | | |
|---|---|---|
| G01S 7/497 | (2006.01) | |
| G01S 7/483 | (2006.01) | |
| G01S 17/10 | (2006.01) | |
| G01S 17/89 | (2006.01) | |
| G01S 7/486 | (2006.01) | |

(52) U.S. Cl.
CPC .............. *G01S 7/497* (2013.01); *G01S 7/483* (2013.01); *G01S 17/10* (2013.01); *G01S 17/89* (2013.01); *G01S 7/4865* (2013.01)

(58) Field of Classification Search
CPC .......... G01S 7/497; G01S 7/483; G01S 17/10; G01S 17/89
See application file for complete search history.

(56) References Cited

U.S. PATENT DOCUMENTS

| | | |
|---|---|---|
| 5,880,612 A | 3/1999 | Kim |
| 6,043,694 A | 3/2000 | Dortu |
| 6,400,197 B2 | 6/2002 | Lai et al. |
| 6,466,168 B1 | 10/2002 | McEwan |
| 6,829,043 B2 | 12/2004 | Lewis et al. |
| 7,012,248 B2 | 3/2006 | Paschalidis |
| 7,202,898 B1 | 4/2007 | Braun et al. |
| 7,405,812 B1 | 7/2008 | Bamji |

(Continued)

FOREIGN PATENT DOCUMENTS

JP    2009236650 A    10/2009

OTHER PUBLICATIONS

Response to International Search Report and Written Opinion filed Oct. 19, 2016 in International Application No. PCT/US2016/035953.

(Continued)

*Primary Examiner* — Eric L Bolda (74) *Attorney, Agent, or Firm* — Rainier Patents, P.S.

(57) ABSTRACT

In accordance with certain embodiments of the present technology, edges of light drive pulses, which are produced by a light source driver and are used to drive a light source, are aligned with edges of light reference pulses that have a predetermined fixed delay relative to light timing pulses. This way, light pulses are emitted by the light source at precisely known times, so that accurate time-of-flight (TOF) measurements can be made. Additionally, edges of shutter drive pulses, which are produced by a shutter driver and are used to drive a gated light detector, are aligned with edges of shutter reference pulses that have a predetermined fixed delay relative to shutter timing pulses. This way, the gated light detector is shuttered on at precisely known times, so that accurate TOF measurements can be made.

20 Claims, 6 Drawing Sheets

(56) References Cited

U.S. PATENT DOCUMENTS

| | | |
|---|---|---|
| 7,482,971 B2 | 1/2009 | Lyon |
| 7,636,150 B1 | 12/2009 | McCauley et al. |
| 7,716,001 B2 | 5/2010 | Lee et al. |
| 7,852,461 B2 | 12/2010 | Yahav |
| 8,717,469 B2 | 5/2014 | Felzenshtein et al. |
| 8,888,287 B2 | 11/2014 | Yahav |
| 9,157,989 B2 * | 10/2015 | Gusev .................... G01S 17/10 |
| 2002/0036765 A1 * | 3/2002 | McCaffrey ............ G01S 17/105 |
| | | 356/5.08 |
| 2008/0002514 A1 | 1/2008 | Oh et al. |
| 2009/0115476 A1 | 5/2009 | Harres |
| 2010/0104048 A1 | 4/2010 | Chen |
| 2012/0154542 A1 | 6/2012 | Katz et al. |
| 2012/0185209 A1 | 7/2012 | Lewis |
| 2013/0278917 A1 | 10/2013 | Keisuke et al. |
| 2015/0041625 A1 | 2/2015 | Dutton et al. |

OTHER PUBLICATIONS

International Search Report and Written Opinion dated Sep. 14, 2016 in International Application No. PCT/US2016/035953.

English Abstract of JP2009236650 published Oct. 15, 2009.

Saghafi, Ardeshir, "A Novel High Resolution Delay Locked Loop", In PhD Thesis, Jul. 2005, 107 pages.

International Preliminary Report on Patentability dated May 23, 2017, in International Application No. PCT/US2016/035953 filed Jun. 6, 2016.

IDT, "Zero Delay Buffers", retrieved at <<https://www.idt.com/document/apn/229-zero-delay-buffers>>, 2001, 7 pages.

Xilinx, "Using Delay-Locked Loops in Spartan-II/IIE FPGAs", retrieved at <<https://www.xilinx.com/support/documentation/application_notes/xapp174.pdf>>, Jun. 16, 2008, 15 pages.

\* cited by examiner

TIME-OF-FLIGHT (TOF) SYSTEM CALIBRATION

BACKGROUND

Many systems determine distances to an object based on an optical time-of-flight (TOF) measurements. More specifically, in such systems, which can be referred to as TOF based distance measurement systems, a pulse of light is emitted by a light source, reflected from a distant object, and received by a light detector. Electronics associated with the light source and the light detector measure the elapsed time from the time the pulse was emitted to the time the reflected pulse (or portion thereof) was received, and the elapsed time is used to calculate a distance at which the object is located. In such systems, the measured length of time (i.e., time delay) that it takes a pulse of light to travel roundtrip corresponds to the distance to the object, at approximately 6.6 nanoseconds/meter. More specifically, since light travels at approximately 3.3 nanoseconds per meter (i.e., the speed of light is approximately 3.3 nanoseconds per meter), the distance to an object can be determined using the equation $d=(c*t)/2$, where c is the speed of light and t is the time delay.

If the goal is to measure this time delay of a few nanoseconds to accuracies of 1 centimeter or less, then a precision of approximately 66 picoseconds would be required. However, such precision is difficult to achieve for various reasons. For example, there are delays in the signal path that an electrical pulse travels before it reaches the light source (typically a laser) and causes the light source to emit a corresponding pulse of light. Similarly, there are delays in the signal path from the light detector to electronics that determine TOF measurements. These added delays are typically on the order of several nanoseconds, which are comparable to the delay being measured. Making such precision even more challenging is the fact that these delays in the signal paths can vary significantly over time with changes in temperature, e.g. by several nanoseconds, significantly reducing the precision of the measurements.

Conventional approaches to compensating for the variable delays in the signal paths include re-calibrating a TOF based distance measurement system periodically by positioning a reference target at a precisely known distance, determining offsets at specific times, and correcting TOF readings based on such determined offsets. Such an approach is reasonable, but has several problems. First, a reference target needs to be built into the system, which typically requires additional hardware resources, complications and costs. Further, there is a need to periodically perform measurements associated with the reference target, and potentially as part of every TOF reading. This will slow down the system by the amount of the extra readings required for the dynamic recalibrations. Additionally, there is a need to correct each TOF measurement taken, using the reference calibration measurements, which will take additional time and possibly additional hardware to perform this dynamic calibration.

SUMMARY

In accordance with certain embodiments of the present technology, edges of light drive pulses, which are produced by a light source driver and are used to drive a light source, are aligned with edges of light reference pulses that have a predetermined fixed delay (e.g., 10 ns) relative to light timing pulses. This way, light pulses are emitted by the light source at precisely known times, so that accurate TOF measurements can be made. Additionally, edges of shutter drive pulses, which are produced by a shutter driver and are used to drive a gated light detector, are aligned with edges of shutter reference pulses that have a predetermined fixed delay (e.g., 10 ns) relative to shutter timing pulses. This way, the gated light detector is shuttered on at precisely known times, so that accurate TOF measurements can be made.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DETAILED DESCRIPTION

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

Figure 1:
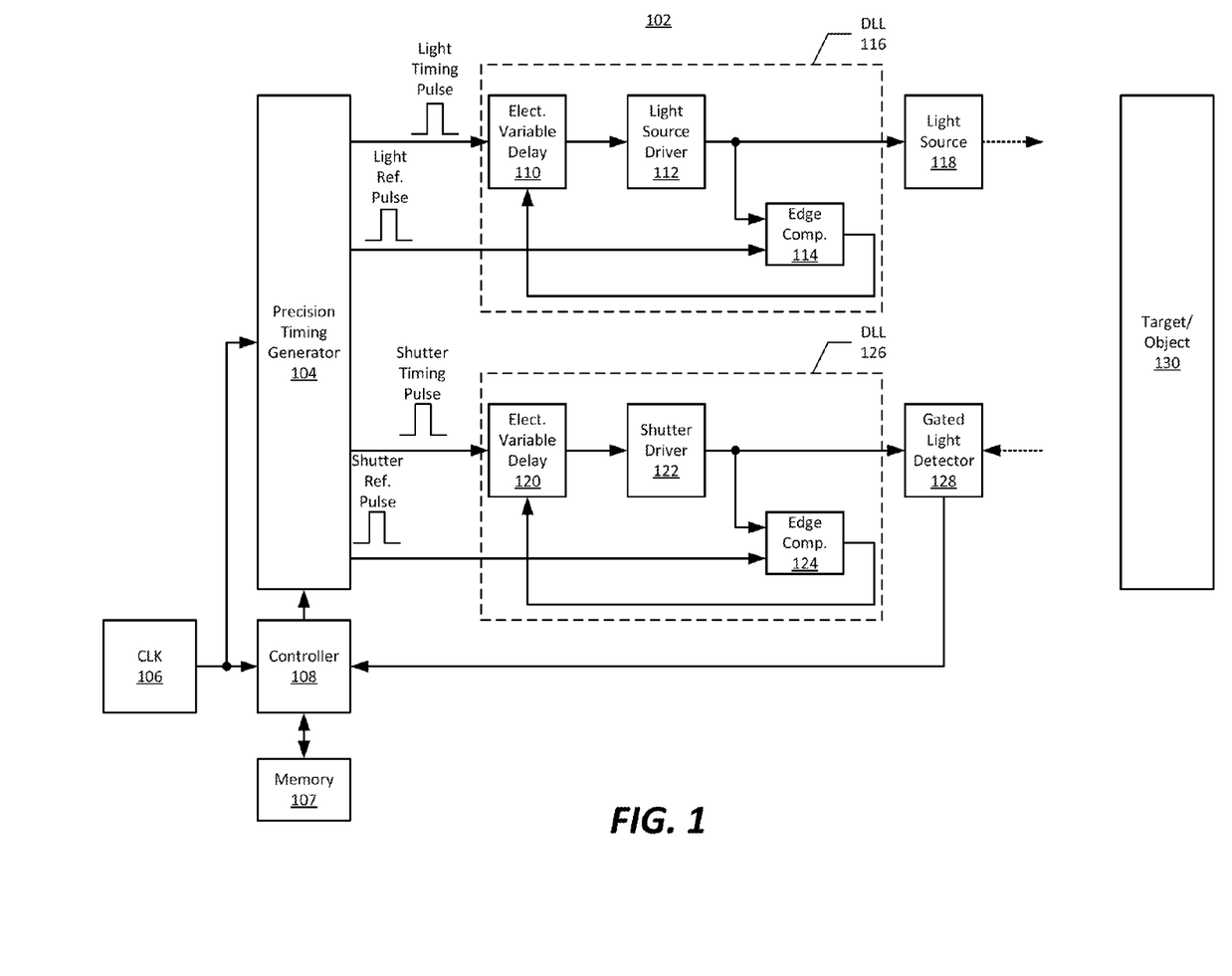
FIG. 1 illustrates a system that can produce time-of-flight (TOF) measurements in accordance with embodiments of the present technology.

FIG. 1 illustrates a system 102 that can produce time-of-flight (TOF) measurements, and in dependence on the TOF measurements, can detect the distance to an object, wherein the object is represented by a block 130. Referring to FIG. 1, the system 102 is shown as including a precision timing generator 104, a clock 106, memory 107, a controller 108, a light source driver 112 and a light source 118. The system 102 is also shown as including a shutter driver 122 and a gated light detector 128. Additionally, the system 102 is also shown as including electrically variable delays 110 and 120, and edge comparators 114 and 124, which, as will be described below, are used to precisely control when the light source 118 emits pulses of light and when the gated light detector 128 is shuttered (also referred to as gated) on and off, in accordance with embodiments of the present technology.

The light source 118 can be a laser diode, or a light emitting diode, but is not limited thereto. Where the light source 118 is a laser diode, the laser diode can be, e.g., an edge emitting laser diode or an array of vertical-cavity surface-emitting lasers (VCSELs). While it is likely that the light source 118 emits (also referred to as radiates) near infrared (NIR) or infrared (IR) light pulses, light pulses of other wavelengths of light can alternatively be emitted.

The gated light detector 128 can include a photosensitive surface of a semiconductor device such as Charge Coupled Device (CCD) or a Complementary Metal-Oxide-Silicon (CMOS) light sensitive device, having one or more light sensitive pixels formed on a silicon or other suitable substrate. A shutter, which is used to shutter (also referred to as gate) the photosensitive surface on or off (also referred to as open or closed) may comprise, by way of example, a gated image intensifier, or a solid state electro-optical or acousto-optical modulator, but is not limited thereto. For a more specific example, the gated light detector 128 can include an array of hundreds or thousands of light sensitive pixels that are used to obtain TOF depth images of an object, represented by the block 130 in FIG. 1. In such a case, the gated light detector 128 can be considered part of a gated TOF depth camera. Shuttering a TOF depth camera open or closed is also commonly referred to as "gating" a camera open or closed (hence the name "gated time-of-flight 3D camera") and refers to respectively enabling or preventing registration by the camera's photosurface of light collected by the camera. Gating a camera open or closed is also referred to herein as respectively gating open or gating closed its photosurface. Terms "gating on" and "gating off" a camera or a camera's photosurface are also used herein and respectively mean gating open and gating closed the photosurface or camera. "Shuttering" or "gating" a photosurface or camera without modification by the adverb "open" or "closed" refers to an operation of gating on and/or gating off the photosurface or camera.

A period of time during which a TOF depth camera is gated open is an exposure period during which the camera's photosurface registers light that the camera collects and directs to the camera's photosurface. A photosurface registers light by accumulating and storing charge, hereinafter "photocharge", which the light generates in the photosurface's pixels. The light generates photocharge by creating electron-hole pairs in the photosurface pixels. Depending on a doping configuration of the photosurface, the accumulated and stored photocharge may be either electrons or holes from the electron-hole pairs.

To image a scene and determine distances from the camera to features in the scene, the scene can be illuminated, for example with a train of light pulses (also referred to as a burst of light sources) emitted by the light source 118. Typically, the emitted (also referred to as radiated) light pulses are infrared (IR) or near infrared (NIR) light pulses, as mentioned above. The camera is gated open for an exposure period for each radiated light pulse in the train, following a predetermined delay from a time at which the light pulse is radiated. For a feature imaged on a pixel in the photosurface, light reflected by the feature from each radiated light pulse is registered on a pixel imaging the feature if the reflected light reaches the camera (and more specifically, the gated light detector 128) during the exposure period following the light pulse.

Following a last light pulse in the light pulse train, charges accumulated in the pixels of the photosurface during the exposure periods can be sensed and converted to voltages. The set of voltages representing the accumulated charges is referred to as a "frame" of the photosurface. Since the time elapsed between radiating a light pulse and the exposure period that follows it is known, a time it took imaged light that is registered by the pixels to travel from the light source to the reflecting features and back to the camera (and more specifically, the gated light detector 128) is known. Light registered by the pixels, the speed of light and the time elapsed is used to determine distances to features in the scene.

In accordance with an embodiment, the controller 108 can calculate distances between an object (e.g., 130) and the system 102. Where the gated light detector 128 includes an array (e.g., of hundreds or thousands) of light sensitive pixels, the controller 108 can obtain a distance or depth value for each of the pixels, which can collectively be used to obtain TOF depth images of the object, or more generally of a scene that include one or more objects. The portion of the controller 108 that determines such distances or depths can be referred to as a distance calculator or a depth calculator. It is also possible that the distance calculator or depth calculator is implemented external to the controller 108. As noted above, the controller 108 can be implemented by a microprocessor, a microcontroller or a digital signal processor, but is not limited thereto. Where a distance calculator or a depth calculator is external to the controller 108, such a calculator can be implemented by a microprocessor, a microcontroller or a digital signal processor, but is not limited thereto. More generally, the controller 108, or a further controller, produces time-of-flight (TOF) measurements in dependence on detected pulses of light that are incident on the photosurface of the gated light detector 128 while the photosurface is shuttered on.

Where TOF depth images are produced, each depth image may include a two-dimensional (2-D) or three-dimensional (3-D) pixel area of a captured scene where each pixel in the 2-D or 3-D pixel area may represent a depth value such as a distance in, for example, centimeters, millimeters, or the like of an object in the captured scene from the camera. In certain embodiments, a depth image can specify, for each of the pixels in the depth image, a pixel location and a pixel depth.

Additional details about the operation of the system 102 will initially be described assuming that the electrically variable delays 110 and 120, and the edge comparators 114 and 124, are not present. Thereafter, the operation and benefits of including the electrically variable delays 110 and 120 and the edge comparators 114 and 124 will be described, as will various implementations thereof.

Still referring to FIG. 1, the precision timing generator 104 is shown as receiving a clock signal from a clock 106 being controlled by a controller 108. The clock signal can be, e.g., a 45 MHz clock signal, but is not limited thereto. The controller 108 can be implemented by a microprocessor, a microcontroller or a digital signal processor, but is not limited thereto. The memory 107 can stored instructions for that are used by the controller 108 to control the timing of signals produced by the precision timing generator 104. The memory 107 can additionally store TOF measurements and/or depth images. These are just a few examples of the type of information that can be stored in the memory 107, which is not intended to be all encompassing.

In accordance with an embodiment, the controller 108 controls the precision timing generator 104 to output timing pulses that are used to control the timing of light pulses emitted by the system 102, in which case, the timing pulses can be referred to a light timing pulses. The light timing pulses can be produced at a single output (e.g., a single output pin) of the precision timing generator 104. Alternatively, the light timing pulses can be produced at a pair of outputs (e.g., a pair of output pins) of the precision timing generator 104, wherein a timing signal at a first one of the outputs specifies the leading edge of a light timing pulse, and a timing signal at the second one of the outputs specifies the trailing edge of the light timing pulse. In other words, a first signal output by the precision timing generator 104 can specify the start of a light timing pulse, and a second output of the precision timing generator 104 can specify the end of the light timing pulse.

In accordance with an embodiment, the system 102 can be configured to cause the light source 118 to emit a burst of pulses (also referred to as a train of pulses) multiple (e.g., 30) times per second. In other words, where the system 102 is part of a TOF depth camera, the TOF depth camera can have a frame rate of 30 frames per second. Each of the bursts of pulses can include, e.g., 10,000 pulses, with each of the pulses in a burst being approximately 6 ns in width, and each of the pulses in the burst being spaced apart from one another by about 200 ns. These are just examples, which are not meant to be limiting.

Assuming the electrically variable delay 110 is not present, the light timing pulses produced by precision timing generator 104 are provided to the light source driver 112 and are used by the light source driver 112 to produce light drive pulses that drive the light source 118 to emit pulses of light. Explained another way, the light source driver 112 converts light timing pulses to light drive pulses having the appropriate current, and more generally the appropriate power, required to drive the light source 118. Where the light source 118 is a laser or laser diode, the light source driver 112 can be referred to more specifically as a laser driver or a laser diode driver.

The light source driver 112 causes a delay in the signal path between the precision timing generator 104 and the light source 118 which should be calibrated out to determine precise TOF measurements. If the delay caused by the light source driver 112 were constant, then it would be relatively simple to calibrate out the delay. For example, if the light source driver 112 caused a fixed delay of 5 ns in the signal path, then the system would know that the light source 118 would emit a pulse of light precisely 5 ns after the time specified by a light timing pulse produced by the precision timing generator 104. Thus, to calibrate out such a fixed delay, each TOF measurement can simply be reduced by 5 ns. However, this is not the case, as the delay caused by the light source driver 112 can actually vary, e.g., by about 5 ns, in dependence on variations in temperature and/or variations in a supply voltage used to power the light source driver 112. For a more specific example, the light source driver 112 may cause a nominal delay of 5 ns, which varies between 2.5 ns and 7.5 ns. This is just an example, which is not meant to be limiting. Embodiments of the present technology, which will be described below, after a discussion of the shutter driver 112, can be used to effectively cause a delay in the signal path between the precision timing generator 104 and the light source 118 to be substantially constant, and thus, easily calibrated for.

In accordance with an embodiment, the controller 108 controls the precision timing generator 104 to output shutter timing pulses that are used to control the shuttering of the gated light detector 128, in which case, the timing pulses can be referred to a shutter timing pulses. The shutter timing pulses can be produced at a single output (e.g., a single output pin) of the precision timing generator 104. Alternatively, the shutter timing pulses can be produced at a pair of outputs (e.g., a pair of output pins) of the precision timing generator 104, wherein a timing signal at a first one of the outputs specifies the leading edge of a shutter timing pulse, and a timing signal at the second one of the outputs specifies the trailing edge of the shutter timing pulse. In other words, a first signal output by the precision timing generator 104 can specify the start of a shutter timing pulse, and a second output of the precision timing generator 104 can specify the end of the shutter timing pulse. The frequency at which the gated light detector 128 is gated or shuttered can be the same as or similar to the frequency at which the light source 118 is driven to emit of pulses of lights, but that need not be the case.

Assuming the electrically variable delay 120 is not present, the shutter timing pulses produced by precision timing generator 104 are provided to the shutter driver 122 and are used by the shutter driver 122 to produce shutter drive pulses that drive the gated light detector 128. Explained another way, the shutter driver 122 converts shutter timing pulses to shutter drive pulses having the appropriate current, and more generally the appropriate power, required to drive the gated light detector 128.

As was the case with the light source driver 112, the shutter driver 122 causes a delay in the signal path between the precision timing generator 104 and the gated light detector 128, which delay should be calibrated out to determine precise TOF measurements. If the delay caused by the shutter driver 122 were constant, then it would be relatively simple to calibrate out the delay. For example, if the shutter driver 122 caused a fixed delay of 5 ns in the signal path, then the system would know that the gated light detector 128 would be driven to be shuttered on precisely 5 ns after the time specified by a shutter timing pulse produced by the precision timing generator 104. Thus, to calibrate out such a fixed delay, each TOF measurement can simply be adjusted by 5 ns. However, this is not the case, as the delay caused by the shutter driver 122 can actually vary, e.g., by about 5 ns, in dependence on variations in temperature and/or variations in a supply voltage used to power the shutter driver 122. For a more specific example, the shutter driver 112 may cause a nominal delay of 5 ns, which varies between 2.5 ns and 7.5 ns. This is just an example, which is not meant to be limiting. Embodiments of the present technology, which will be described below, can be used to effectively cause a delay in the signal path between the precision timing generator 104 and the gated light detector 128 to be substantially constant, and thus, easily calibrated for.

In accordance with embodiments of the present technology, edges of light drive pulses, used to drive the light source 118, are aligned with edges of light reference pulses that have a predetermined fixed delay (e.g., 10 ns) relative to the light timing pulses provided to the light source driver 112. This way, light pulses are emitted by the light source 118 at precisely known times. In accordance with certain embodiments, it is the leading edges of light drive pulses, used to drive the light source 118, that are aligned with the leading edges of the light reference pulses. Alternatively, the trailing edges of light drive pulses, used to drive the light source 118, are aligned with the trailing edges of the light reference pulses. In still other embodiments, the leading and trailing edges of light drive pulses are aligned, respectively, with the leading and trailing edges of the light reference pulses.

Similarly, in accordance with embodiments of the present technology, edges of shutter drive pulses, used to drive the gated light detector 128, are aligned with edges of reference shutter pulses that have a predetermined fixed delay (e.g., 10 ns) relative to the shutter timing pulses provided to the shutter driver 122. This way, the gated light detector 128 is driven to be shuttered on at precisely known times. In accordance with certain embodiments, it is the leading edges of shutter drive pulses, used to drive the gated light detector 128, that are aligned with the leading edges of the shutter reference pulses. Alternatively, the trailing edges of shutter drive pulses, used to drive the gated light detector 128, are aligned with the trailing edges of the shutter reference pulses. In still other embodiments, the leading and trailing edges of shutter drive pulses are aligned, respectively, with the leading and trailing edges of the shutter reference pulses.

Still referring to FIG. 1, in accordance with certain embodiments of the present technology, the controller 108 controls the precision timing generator 104 to produce light timing pulses and corresponding light reference pulses, which have a specified fixed delay relative to the light timing pulses. As shown in FIG. 1, the light timing pulses are provided to the electrically variable delay 110 before they are provided to the light source driver 112. More specifically, the electrically variable delay 110 receives the light timing pulses, produced by the precision timing generator 104, and outputs delayed light timing pulses, which are provided to the light source driver 112. The light source driver 112 produces light drive pulses in dependence on the delayed light timing pulses output by the electrically variable delay 110, and the light drive pulses are used to drive the light source 118 to cause the light source 118 to emit pulses of light.

As shown in FIG. 1, the output of the light source driver 112 (i.e., light drive pulses) are also provided to the edge comparator 114, which also receives the light reference pulses. More specifically, the edge comparator 114 compares edges of the light drive pulses, produced by the light source driver 112, to corresponding edges of the corresponding light reference pulses (produced by the precision timing generator 104) to produce a binary edge comparison signal indicative of whether the edges of the light drive pulses lag or lead the corresponding edges of the corresponding light reference pulses. As noted above, the edges that are compared can be the leading edges, the trailing edges, or both the leading and trailing edges. For the sake of simplicity and consistency, unless stated other way, for much of the following discussion it will be assumed that the edge comparator 114 compares the leading edges of light drive pulses (produced by the light source driver 112) to the leading edges of corresponding light reference pulses.

The output of the edge comparator 114 is either high or low (i.e., a logic level 1 or 0), with one of the logic levels indicating that a light drive pulse lags (i.e., is later than) its corresponding light reference pulse, and the other one of the logic levels indicating that a light drive pulse leads (i.e., is earlier than) its corresponding light reference pulse. For example, a high output (i.e., logic level 1) from the edge comparator 114 can indicate that a light drive pulse lags its corresponding light reference pulse, and a low output (i.e., logic level 0) from the edge comparator 114 can indicate that a light drive pulse lags its corresponding light reference pulse. Alternatively, a low output (i.e., logic level 0) from the edge comparator 114 can indicate that a light drive pulse lags its corresponding light reference pulse, and a high output (i.e., logic level 1) from the edge comparator 114 can indicate that a light drive pulse lags its corresponding light reference pulse. Explained another way, a high output (i.e., logic level 1) from the edge comparator 114 can indicate that a light drive pulse is late, and a low output (i.e., logic level 0) from the edge comparator 114 can indicate that a light drive pulse is early; or alternatively, a high output (i.e., logic level 1) from the edge comparator 114 can indicate that a light drive pulse is early, and a low output (i.e., logic level 0) from the edge comparator 114 can indicate that a light drive pulse is late. This is a matter of implementation, and either embodiment will work so long as the electrically variable delay 110, which responds to the binary edge comparison signal (output by the edge comparator 114) is designed accordingly.

Still referring to FIG. 1, the electrically variable delay 110 is adjusted over time, in dependence on the binary edge comparison signal produced by the edge comparator 114, to cause edges (e.g., leading edges) of light drive pulses, produced by the light source driver 112, to substantially align with corresponding edges (e.g., leading edges) of corresponding light references pulses. Where the binary edge comparison signal (produced by the edge comparator 114) indicates that an edge of a light drive pulse lags (i.e., is later than) a corresponding edge of a corresponding light reference pulse, the delay of the electrically variable delay 110 is reduced. Conversely, where the binary edge comparison signal (produced by the edge comparator 114) indicates that an edge of a light drive pulse leads (i.e., is earlier than) a corresponding edge of a corresponding light reference pulse, the delay of the electrically variable delay 110 is increased. In such an embodiment, the electrically variable delay 110, the light source driver 112 and the edge comparator 114 collectively provide a delay locked loop (DLL) 116. In accordance with certain embodiments, two edges are considered to be substantially aligned with one another if they are within 200 ps of one another. The edges of drive pulses and corresponding reference pulses are preferably within 100 ps of one another, more preferably within 66 ps of one another, and even more preferably within 50 ps of one another.

In accordance with certain embodiments, the edge comparator 114 can be implemented using a simple cross coupled-latch, e.g., implemented using a pair of cross-coupled NAND gates. In accordance another embodiment, the edge comparator 114 can be implemented using a D flip-flop, wherein light drive pulses are provided to the D input of the D flip-flop, the light reference pulses are provided to the CLK input of the D flip-flop, with the binary edge comparison signal (i.e., the output of the edge comparator 114) being produced at the Q output of the D flip-flop. Such a D flip-flop can be a leading edge triggered flip-flop, which is triggered on the leading edges of light reference pulses provided to the CLK input of the D flip-flop. Alternatively, the D flip-flop can be a trailing edge triggered flip-flop, which is triggered on the trailing edges of light reference pulses provided to the CLK input of the D flip-flop. Other variations are possible, and within the scope of embodiments of the present technology described herein. For the sake of simplicity and consistency, unless stated other way, for much of the following discussion it will be assumed that the edge comparator 114 is implemented as a leading edge triggered D flip-flop, wherein the light drive pulses are provided to the D input of the D flip-flop, the light reference pulses are provided to the CLK input of the D flip-flop, with the binary edge comparison signal (i.e., the output of the edge comparator 114), which is produced at the Q output of the D flip-flop, being triggered on the leading edges of light reference pulses provided to the CLK input of the D flip-flop.

A potential alternative to using the edge comparator 114 to produce a binary edge comparison signal would be to use a phase comparator to detect an actual time difference or phase difference between a light drive pulse and a corresponding light reference pulse. However, such a phase comparator would be much more complex and costly to implement than a relatively simple edge comparator 114. Further, a phase comparator would likely take up much more real estate on a circuit board or in a chip than a simple edge comparator used in embodiments of the present technology. Accordingly, it is believed to be preferred and beneficial to use the edge comparator 114 (and the edge comparator 124) compared to using a more complex phase comparator.

Figure 2:
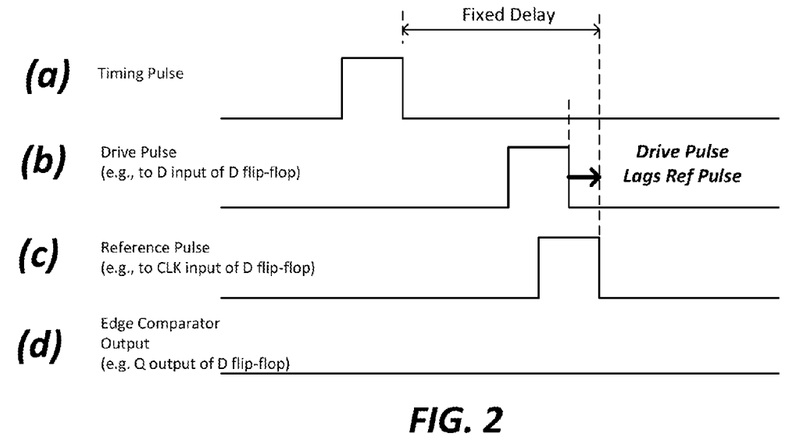
FIGS. 2 and 3 are exemplary timing diagrams that are useful for explaining the operation of the system introduced in FIG. 1.
Figure 3:
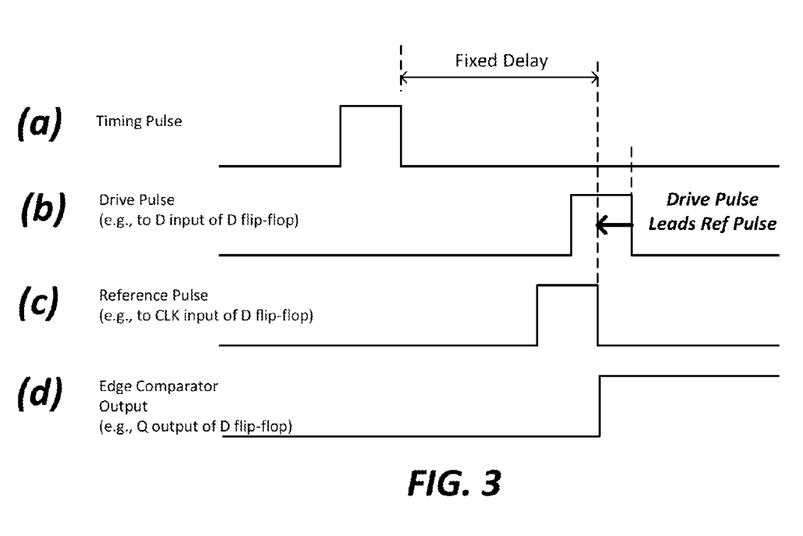

FIGS. 2 and 3 are exemplary timing diagrams that are useful for explaining the operation of the system 102 introduced in FIG. 1. Referring to FIG. 2, the waveform (a) is illustrative of an exemplary light timing pulse, or shutting timing pulse, produced using the precision timing generator 104, and thus can simply be referred to as a timing pulse; the waveform (b) is illustrative of an exemplary light drive pulse output by the light source driver 112, or an exemplary shutter drive pulse output by the shutter driver 122, and thus can be simply referred to as a drive pulse; and the waveform (c) is illustrative of an exemplary light reference pulse, or shutter reference pulse, producing using the precision timing generator 104, and thus can be simply referred to as a reference pulse. In accordance with certain embodiments described herein, the edge comparator 114 (or 124) compares the drive pulse (in waveform (b)) to the reference pulse (in waveform (c)) to produce the binary edge comparison signal that is provided to the electrically variable delay 110 (or 120). In the example shown in FIG. 2, the drive pulse is shown as lagging the reference pulse, and thus, the electrically variable delay would be adjusted to reduce its delay. FIG. 3 is similar to FIG. 2, but shows the drive pulse leading the reference pulse, and thus, the electrically variable delay would be adjusted to increase its delay.

Referring again to FIG. 1, in accordance with certain embodiments of the present technology, the controller 108 controls the precision timing generator 104 to produce shutter timing pulses and corresponding shutter reference pulses, which have a specified fixed delay relative to the shutter timing pulses. As shown in FIG. 1, the shutter timing pulses are provide to the electrically variable delay 120 before they are provided to the shutter driver 122. More specifically, the electrically variable delay 120 receives the shutter timing pulses, produced by the precision timing generator 104, and outputs delayed shutter timing pulses, which are provided to the shutter driver 122. The shutter driver 122 produces shutter drive pulses in dependence on the delayed shutter timing pulses output by the electrically variable delay 120, and the shutter drive pulses are used to drive the gated light detector 128 to cause the gated light detected 128, and more specifically, a photosurface thereof, to be shuttered on (which can also be referred to as shuttered open, gated on, or gated open).

As shown in FIG. 1, the output of the shutter driver 122 (i.e., shutter drive pulses) are also provided to the edge comparator 124, which also receives the shutter reference pulses. More specifically, the edge comparator 124 compares edges of the shutter drive pulses, produced by the shutter driver 122, to corresponding edges of the corresponding shutter reference pulses to produce a further binary edge comparison signal indicative of whether the edges of the shutter drive pulses lag or lead the corresponding edges of the corresponding shutter reference pulses. As noted above, the edges that are compared can be the leading edges, the trailing edges, or both the leading and trailing edges. For the sake of simplicity and consistency, unless stated other way, for much of the following discussion it will be assumed that the edge comparator 124 compares the leading edges of shutter drive pulses (produced by the shutter driver 122) to the leading edges of corresponding shutter reference pulses.

The output of the edge comparator 124 is either high or low (i.e., a logic level 1 or 0), with one of the logic levels indicating that a shutter drive pulse lags (i.e., is later than) its corresponding shutter reference pulse, and the other one of the logic levels indicating that a shutter drive pulse leads (i.e., is earlier than) its corresponding shutter reference pulse. For example, a high output (i.e., logic level 1) from the edge comparator 124 can indicate that a shutter drive pulse lags its corresponding shutter reference pulse, and a low output (i.e., logic level 0) from the edge comparator 124 can indicate that a shutter drive pulse lags its corresponding shutter reference pulse. Alternatively, a low output (i.e., logic level 0) from the edge comparator 124 can indicate that a shutter drive pulse lags its corresponding shutter reference pulse, and a high output (i.e., logic level 1) from the edge comparator 124 can indicate that a shutter drive pulse lags its corresponding shutter reference pulse. Explained another way, a high output (i.e., logic level 1) from the edge comparator 124 can indicate that a shutter drive pulse is late, and a low output (i.e., logic level 0) from the edge comparator 124 can indicate that a shutter drive pulse is early; or alternatively, a high output (i.e., logic level 1) from the edge comparator 124 can indicate that a shutter drive pulse is early, and a low output (i.e., logic level 0) from the edge comparator 124 can indicate that a shutter drive pulse is late. This is a matter of implementation, and either embodiments will work so long as the electrically variable delay 120, which responds to the further binary edge comparison signal (output by the edge comparator 124) is designed accordingly.

In a similar manner that the electrically variable delay 110 is adjusted over time in dependence on the binary edge comparison signal produced by the edge comparator 114, the electrically variable delay 120 is adjusted over time, in dependence on the further binary edge comparison signal produced by the edge comparator 124, to cause edges (e.g., leading edges) of shutter drive pulses, produced by the shutter driver 122, to substantially align with corresponding edges (e.g., leading edges) of corresponding shutter references pulses. Where the further binary edge comparison signal (produced by the edge comparator 124) indicates that an edge of a shutter drive pulse lags (i.e., is later than) a corresponding edge of a corresponding shutter reference pulse, the delay of the electrically variable delay 120 is reduced. Conversely, where the binary edge comparison signal (produced by the edge comparator 124) indicates that an edge of a shutter drive pulse leads (i.e., is earlier than) a corresponding edge of a corresponding shutter reference pulse, the delay of the electrically variable delay 120 is increased. In such an embodiment, the electrically variable delay 120, the shutter driver 122 and the edge comparator 124 collectively provide a delay locked loop (DLL) 126.

The edge comparator 124 can be implemented in a same or similar manner as the edge comparator 114. For example, the edge comparator 124 can be implemented using a simple cross coupled-latch (e.g., implemented using a pair of cross-coupled NAND gates), or using a D flip-flop. Such a D flip-flop can be a leading edge triggered flip-flop, which is triggered on the leading edges of shutter reference pulses provided to the CLK input of the D flip-flop. Alternatively, the D flip-flop can be a trailing edge triggered flip-flop, which is triggered on the trailing edges of shutter reference pulses provided to the CLK input of the D flip-flop. Other variations are possible, and within the scope of embodiments of the present technology described herein. For the sake of simplicity and consistency, unless stated other way, for much of the following discussion it will be assumed that the edge comparator 124 is implemented as a leading edge triggered D flip-flop, wherein shutter drive pulses are provided to the D input of the D flip-flop, the shutter reference pulses are provided to the CLK input of the D flip-flop, with the further binary edge comparison signal (i.e., the output of the edge comparator 124), which is produced at the Q output of the D flip-flop, being triggered on the leading edges of shutter reference pulses provided to the CLK input of the D flip-flop.

In the above description of the embodiments described with reference to FIGS. 1, 2 and 3, the light source 118 was generally described as emitting light in response to light drive pulses that go from low to high. This would be the case where the anode(s) of the light source 118 is/are connected to the output of the light source driver 112, and the cathode(s) of the light source 118 is/are connected to ground. Alternatively, the anode(s) of the light source 118 can be connected to a high voltage supply (e.g., Vcc), and the cathode(s) of the light source 118 can be connected to the output of the light source driver 112, in which case the light source 118 would emit light in response to light drive pulses that go from high to low. One of ordinary skill in the art would appreciate that depending upon which implementation is used, certain signals discussed with reference to FIGS. 1, 2 and 3, and other figures discussed herein, may need to be inverted so that appropriate voltage and logic levels are applied to the various circuit elements described herein to achieve the desired functionality described herein.

Figure 4:
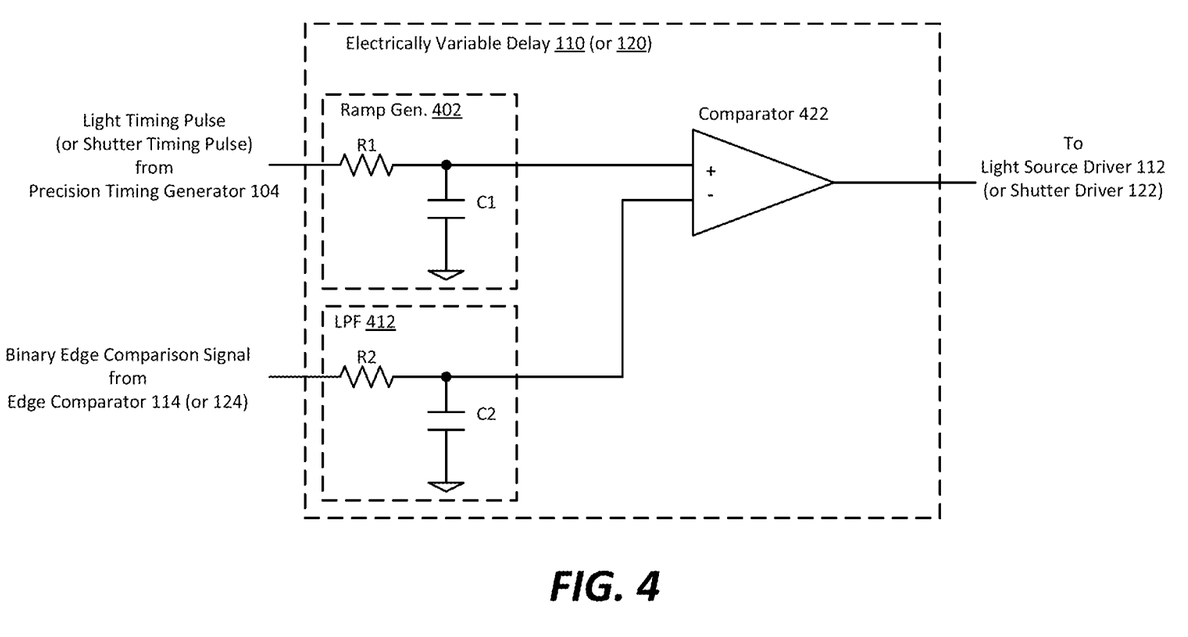
FIG. 4 illustrates an implementation of the electrically variable delay, introduced in FIG. 1, according to an embodiment of the present technology.

FIG. 4 illustrates an implementation of the electrically variable delay 110, according to an embodiment of the present technology. Referring to FIG. 4, the electrically variable delay 110 is shown as including a ramp generator 402, a low pass filter (LPF) 412, and a comparator 422. The ramp generator 402 is shown as being implemented using a resistor R1 and a capacitor C1. An exemplary value for the resistor R1 is 100 ohms (Ω), and an exemplary value for the capacitor C1 is 50 picofarads (pF). The low pass filter (LPF) 412 is shown as being implemented using a resistor R2 and a capacitor C2. An exemplary value for the resistor R2 is 10 kiloohms (kΩ), and an exemplary value for the capacitor C1 is 20 nanofarads (nF). An input of the ramp generator 402, which is the input of the electrically variable delay 110, receives the light timing pulses from the precision timing generator 104. In response to receiving each light timing pulse (from the precision timing generator 104), the ramp generator 402 generates a ramp signal that ramps up from zero to a peak voltage, and then ramps back down to zero. This ramp signal is shown as being provided to an input of the comparator 422. The other signal (provided to the other input of the comparator 422) can be referred to as a threshold signal, since it specifies the threshold voltage at which the output of the comparator changes states (i.e., logic levels). This threshold signal or threshold voltage is produced by the low pass filter (LPF) 412 in response to the binary edge comparison signal produced by the edge comparator 114.

Still referring to FIG. 4, in accordance with an embodiment of the present technology, when a light drive pulse lags (i.e., is later than) a corresponding light reference pulse, the binary edge comparison signal (produced by the edge comparator 114) will be low (i.e., 0), as was shown in the timing diagram of FIG. 2 discussed above, and thus, the input to the low pass filter (LPF) 412 will be low. This will reduce the voltage of the threshold signal (i.e., the threshold voltage) to which the ramp signal (produced by the ramp generator 402) is compared, which will cause the ramp to reach the threshold level earlier, and thus, the output of the comparator will change states earlier, which in effect, reduces the delay of the electrically variable delay 110. Conversely, in such an embodiment when a light drive pulse leads (i.e., is earlier than) a corresponding light reference pulse, the binary edge comparison signal (produced by the edge comparator 114) will be high (i.e., 1), as was shown in the timing diagram of FIG. 3 discussed above, and thus, the input to the low pass filter (LPF) 412 will be high. This will increase the voltage of the threshold signal (i.e., the threshold voltage) to which the ramp signal (produced by the ramp generator 402) is compared, which will cause the ramp to reach the threshold level later, and thus, the output of the comparator will change states later, which in effect, increases the delay of the electrically variable delay 110.

In the embodiment of FIG. 4, the ramp generator 402 produces a ramp signal in dependence on light timing pulses produced by the precision timing generator 104. The comparator 422, or some other circuitry the as configured to operate in the same or a similar manner, compares the ramp signal to a threshold voltage in order to produce delayed light timing pulses. In order to adjust the variable delay of the electrically variable delay 110, the threshold voltage, to which the ramp signal is compared, is adjusted by a low pass filtered version of the binary edge comparison signal (indicative of whether the edges of the light drive pulses lag or lead the corresponding edges of the corresponding light reference pulses) produced by the edge comparator 114. It is also within the scope of embodiments described herein to produce multiple ramp signals, each of which is compared to a corresponding reference voltage that can be adjusted based on the binary edge comparison signal. For example, one ramp signal can specify a leading edge of each light timing pulse, and another ramp signal can specify a trailing edge of each light timing pulse. The electrically variable delay 120, as noted above, can function in a similar manner as the electrically variable delay 110. In other words, a further instance of the circuit shown in FIG. 4 can be used to implement the electrically variable delay 120.

Figure 5:
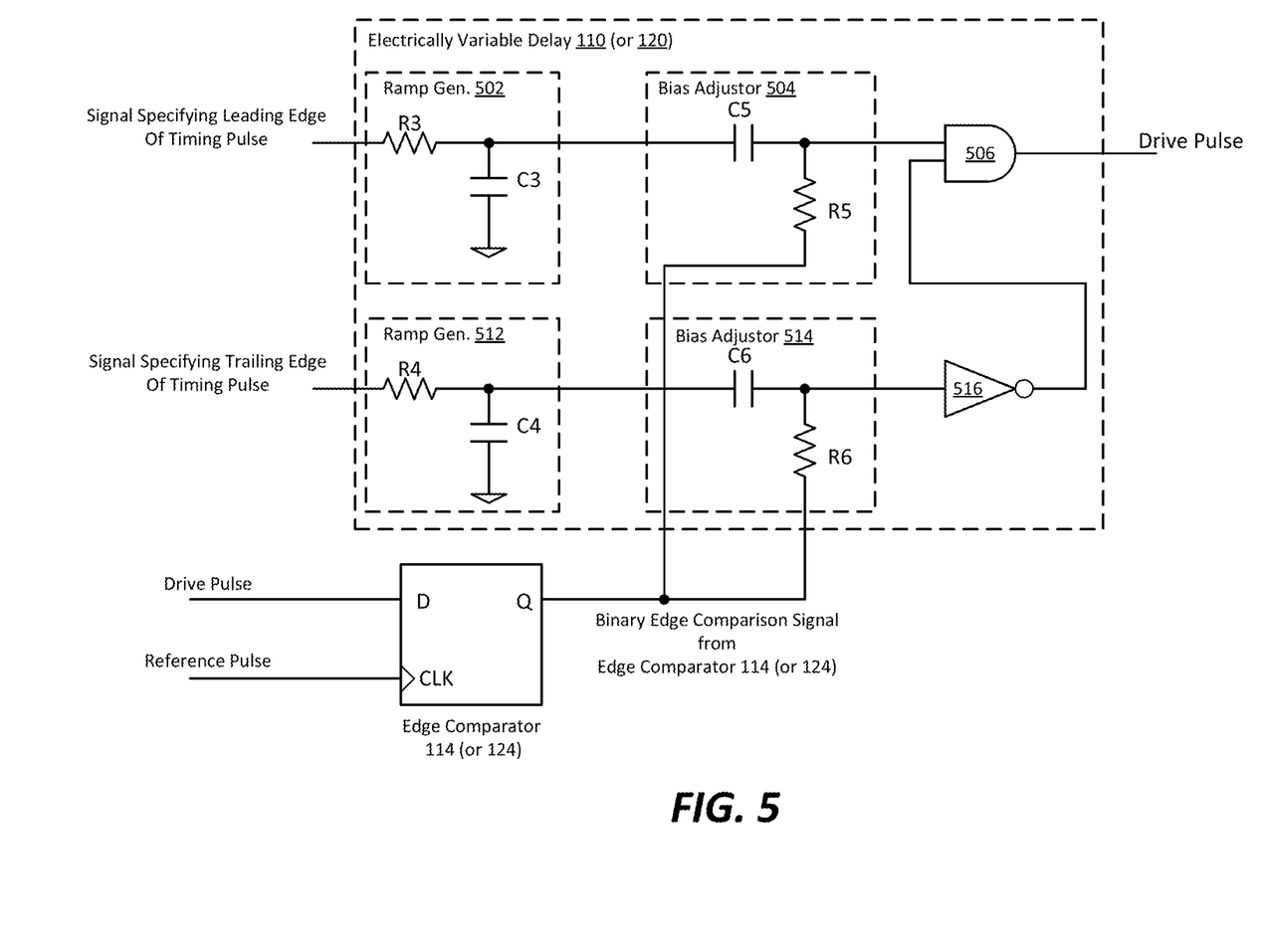
FIG. 5 illustrates an implementation of the electrically variable delay, introduced in FIG. 1, according to another embodiment of the present technology.

FIG. 5 illustrates an implementation of the electrically variable delay 110, according to another embodiment of the present technology. In embodiment shown in FIG. 5, the electrically variable delay 110 receives two signals from the precision timing generator 104, one of which specifies a leading edge of each light timing pulse, and another one of which specifies a trailing edge of each light timing pulse. Each of these signals is provided to a respective ramp generator 502, 512. If the desired pulse width of light timing pulses and light source driving pulses is 6 ns, then the two signals received from the precision timing generator 104 can have the same morphology, with one leading the other by 6 ns.

The ramp generator 502 is shown as being implemented using a resistor R3 and a capacitor C3; and the ramp generator 512 is shown as being implemented using a resistor R4 and a capacitor C4. An exemplary value for each of the resistors R3 and R4 is 100 ohms (Ω), and an exemplary value for each of the capacitors C3 and C4 is 50 picofarads (pF). The electrically variable delay 110 is also shown as including bias adjustors 504, 514, an AND gate 506 and an inverter gate 516. The bias adjustor 504 is shown as including a capacitor C5 connected between the output of the ramp generator 502 and a first input of the AND gate 506. The bias adjustor 504 is also shown as including a resistor R5 connected between the first input of the AND gate 506 and the output of the edge comparator 114, which is shown as being implemented as a D flip-flop. The bias adjustor 544 is shown as including a capacitor C6 connected between the output of the ramp generator 512 and an input of an inverter gate 516. The output of the inverter gate 516 is provided to a second input of the AND gate 506. The bias adjustor 514 is also shown as including a resistor R6 connected between the input of the inverter gate 516 and the output of the edge comparator 114. An exemplary value for each of the resistors R5 and R6 is 10 kiloohms (kΩ), and an exemplary value for each of the capacitors C5 and C6 is 20 nanofarads (nF).

The ramp generator 502 produces a ramp signal based on the signal received from the precision timing generator 104 that specifies the leading edge of each light timing pulse. This ramp signal charges up the voltage across the capacitor C5 of the bias adjustor 504, with this voltage being provided to the first input of the AND gate 506. In the embodiment shown in FIG. 5, when binary edge comparison signal (output by the edge comparator 114) is low (i.e., 0), then the voltage being provided to the first input of the AND gate is pulled down, which will have the effect of increasing how long it takes the ramp signal (produced by the ramp generator 502) to reach a voltage level that the AND gate interprets as a high logic level (i.e., a 1). Conversely, when binary edge comparison signal (output by the edge comparator 114) is high (i.e., 1), then the voltage being provided to the first input of the AND gate is pushed up, which will have the effect of reducing how long it takes the ramp signal (produced by the ramp generator 502) to reach a voltage level the AND gate interprets as a high logic level (i.e., a 1).

The ramp generator 512 produces a ramp signal based on the signal received from the precision timing generator 104 that specifies the trailing edge of each light timing pulse. This ramp signal charges up the voltage across the capacitor C6 of the bias adjustor 514, with this voltage being provided to the input of the inverter gate 516, which can also be referred to as a NOT gate 516. In the embodiment shown in FIG. 5, when binary edge comparison signal (output by the edge comparator 114) is low (i.e., 0), then the voltage being provided to the input of the inverter gate 516 is pulled down, which will have the effect of increasing how long it takes the ramp signal (produced by the ramp generator 512) to reach a voltage level that the inverter interprets as a high logic level (i.e., a 1). Conversely, when binary edge comparison signal (output by the edge comparator 114) is high (i.e., 1), then the voltage being provided to the input of the inverter gate 516 is pushed up, which will have the effect of reducing how long it takes the ramp signal (produced by the ramp generator 512) to reach a voltage level that the inverter gate 516 interprets as a high logic level (i.e., a 1). As used herein, the terms "high" and "high logic level" are used interchangeable, and the terms "low" and "low logic level" are used interchangeable, to refer to, respectively, binary states 1 and 0.

In the embodiment shown in FIG. 5, the output of the AND gate 506 (and thus, the output of the electrically variable delay 110) will be low (i.e., 0) if at least one of the two inputs to the AND gate 506 is low. Conversely, the output of the AND gate 506 (and thus, the output of the electrically variable delay 110) will be high (i.e., 1) when both of the two inputs to the AND gate 506 are high. In order for an input of the AND gate 506 to be considered "high", a threshold voltage of the AND gate should be reached or exceeded. Where the AND gate 506 is powered, for example, by a Vcc of 5V (e.g., where the power supply voltage is 5V), an exemplary voltage threshold for an AND gate input is 2.5V, meaning an input to the AND gate is interpreted is being low when the voltage at the input is between 0V and 2.5V, and the input to the AND gate is interpreted as being high when the voltage at the input is between 2.5V and 5V. Assuming a 2.5V threshold voltage for the AND gate 506, the first input of the AND gate 506 will be high when the ramp generator 502 and the bias circuit 504 collectively cause the voltage at the first input to the AND gate 506 to reach 2.5V. It can also be assumed, for an example, that the threshold voltage for the inverter gate 516 is 2.5V. Assuming a 2.5V threshold voltage for the inverter gate 516, when the input to the inverter is low (e.g., below 2.5V), the output of the inverter will be high. Accordingly, the output of the AND gate 506 will be high, in this example, when the voltage at the first input to the AND gate 506 (which voltage is controlled by the ramp generator 502 and the bias adjustor 504) is high (e.g., at least 2.5V), and the voltage at the input to the inverter gate 516 (which voltage is controlled by the ramp generator 512 and the bias adjustor 514) is low (e.g., below 2.5V). The bias adjustors 504 and 514, which are controlled by the binary edge comparison signal (produced by the edge comparator 114), adjust how long it takes the ramp signals (produced by the ramp generators 502 and 512) to reach the threshold voltage levels associated with the AND gate 504 and the inverter gate 516. When the binary edge comparison signal (produced by the edge comparator 114) is low, this increases how long it takes the ramp signals (produced by the ramp generators 502 and 512) to reach the threshold voltage levels associated with the AND gate 504 and the inverter gate 516, in effect increasing the delay of the electrically variable delay 110. Conversely, when the binary edge comparison signal (produced by the edge comparator 114) is high, this decreases how long it takes the ramp signals (produced by the ramp generators 502 and 512) to reach the threshold voltage levels associated with the AND gate 504 and the inverter gate 516, in effect reducing the delay of the electrically variable delay 110.

Referring briefly back to the system diagram of FIG. 1 and the timing diagrams of FIGS. 2 and 3, assume that the output of the edge comparator 114 is low (i.e., a logic level 0) when the light drive pulse lags (is later than) the corresponding light reference pulse, and the output of the edge comparator 114 is high (i.e., a logic level 1) when the light drive pulse leads (is earlier than) the corresponding light reference pulse. Accordingly, when the binary edge comparison signal (produced by the edge comparator 114) is low, indicating that the light drive pulse lags (is later than) the corresponding light reference pulse, the amount of time that it takes the ramp signals (produced by the ramp generators 502 and 512) to reach the threshold voltage levels associated with the AND gate 504 and the inverter gate 516 is increased, which increases the delay of the electrically variable delay 110. Conversely, when the binary edge comparison signal (produced by the edge comparator 114) is high, indicating that the light drive pulse leads (is earlier than) the corresponding light reference pulse, the amount of time that it takes the ramp signals (produced by the ramp generators 502 and 512) to reach the threshold voltage levels associated with the AND gate 504 and the inverter gate 516 is decreased, which decreases the delay of the electrically variable delay 110.

In the embodiment of FIG. 5, the ramp generators 502 and 512 produce a pair of ramp signals in dependence on the light timing pulses. These ramp signals are provide to logic gates each of which has a corresponding threshold voltage. The logic gates are shown as being the AND gate 506 and the inverter gate 516, but alternative logic gates can be used to achieve the same or similar results. The logic gates are used to produce the delayed light timing pulses, which are the output of the electrically variable delay 110. The variable delay, in this embodiment, is adjusted by adjusting biasing of the ramp signals, in dependence on the binary edge comparison signal indicative of whether the edges of the light drive pulses lag or lead the corresponding edges of the corresponding light reference pulses. Such adjusting of the biasing of the ramp signal adjusts how long it takes for the ramp signals to reach the corresponding threshold voltages of the logic gates used to produce the delayed light timing pulses.

The electronically variable delay 120, which is used to adjust the timing of the delayed shutter timing pulses provided to the shutter driver 122, can be implemented in the same or similar manners as the implementation of the electronically variable delay 110. For example, additional instances of the circuitry shown in FIG. 4 or 5 can be used to implement the electrically variable delay 120.

Figure 6:
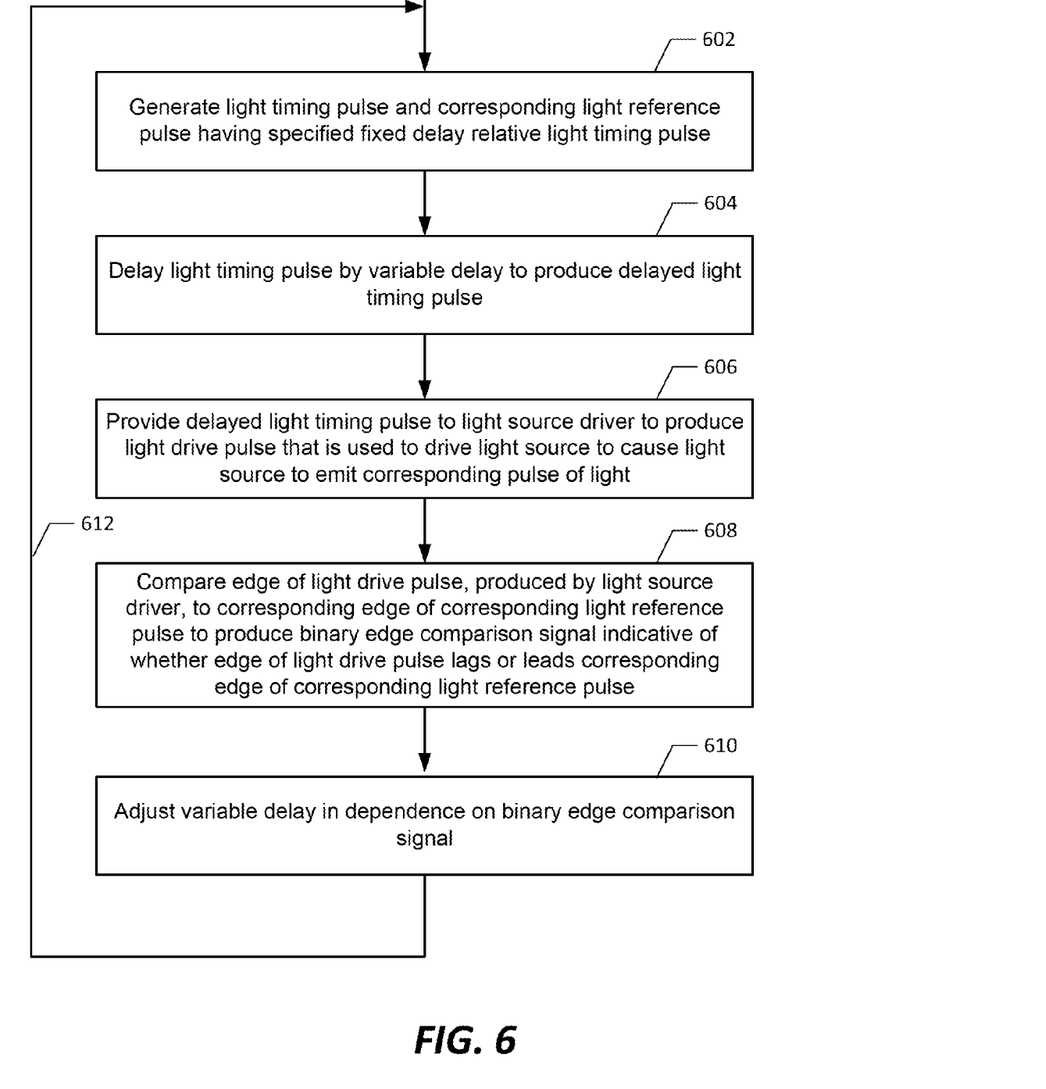
FIGS. 6 and 7 are high level flow diagrams that are used to summarize methods, according to certain embodiments of the present technology.

The high level flow diagram of FIG. 6 will now be used to summarize methods, according to certain embodiments of the present technology, for use in a system (e.g., 102) that can produce time-of-flight (TOF) measurements, wherein the system includes a timing generator (e.g., 104) and a light source driver (112) that selectively drives a light source (e.g., 118). Referring to FIG. 6, step 602 involves generating a light timing pulse and a corresponding a light reference pulse, which has a specified fixed delay relative to the light timing pulse, using the timing generator (e.g., 104). Step 604 involves delaying the light timing pulse by a variable delay to produce a delayed light timing pulse. Step 604 can be implemented using an electrically variable delay (e.g., 110). Exemplary implementations of such an electrically variable delay were described above with reference to FIGS. 4 and 5. Still referring to FIG. 6, step 606 involves providing the delayed light timing pulse to the light source driver (e.g., 112) to produce a light drive pulse that is used to drive the light source (e.g., 118) to cause the light source to emit a corresponding pulse of light. Step 608, which can be performed at the same time as (i.e., simultaneously with) step 606, involves comparing an edge of the light drive pulse, produced by the light source driver (e.g., 112), to a corresponding edge of the corresponding light reference pulse to produce a binary edge comparison signal indicative of whether the edge of the light drive pulse lags or leads the corresponding edge of the corresponding light reference pulse. Step 608 can be performed by an edge comparator (e.g., 114), exemplary details of which were described above. Still referring to FIG. 6, step 610 involves adjusting the variable delay in dependence on the binary edge comparison signal. The line 612 indicates that steps 602, 604, 606, 608 and 610 are repeated over time, which has the effect of causing edges of further light drive pulses to substantially align with edges of further corresponding light references pulses. As explained above, step 608 can involve comparing leading edges of light drive pulses to leading edges of light reference pulses, or comparing trailing edges of light drive pulses to trailing edges of light reference pulses, or comparing both leading and trailing edges of light drive pulses to leading and trailing edges of light reference pulses. In other words, it can be the leading edges of light drive pulses, used to drive the light source, that are aligned with the leading edges of the light reference pulses. Alternatively, it can be the trailing edges of light drive pulses, used to drive the light source, that are aligned with the trailing edges of the light reference pulses. In still other embodiments, the leading and trailing edges of light drive pulses are aligned, respectively, with the leading and trailing edges of the light reference pulses.

The system (e.g., 102) that can be used to implement the methods summarized above with reference to FIG. 6 can also include a shutter driver (e.g., 122) that selectively drives a gated light detector (e.g., 128). In such a system, the methods can include further steps, which will be described with reference to FIG. 7.

Figure 7:
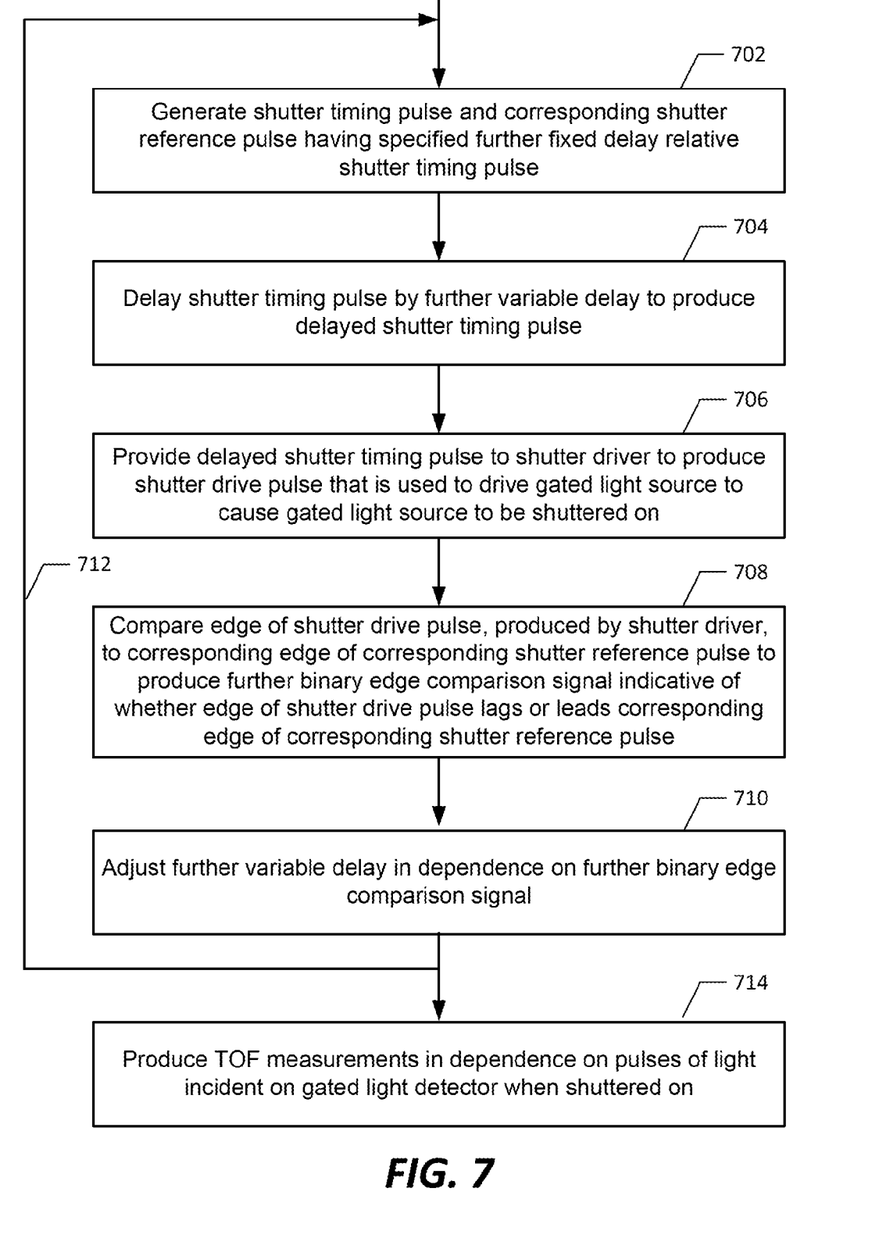

Referring to FIG. 7, step 702 involves generating a shutter timing pulse and a corresponding a shutter reference pulse, which has a further fixed delay relative to the shutter timing pulse, using the timing generator. The further fixed delay, referred to in step 702, can be the same as or different than the fixed delay referred to in step 602 discussed above. Still referring to FIG. 7, step 704 involves delaying the shutter timing pulse by a further variable delay to produce a delayed shutter timing pulse. Step 704 can be implemented using an electrically variable delay (e.g., 120), exemplary implementations of which were described above with reference to FIGS. 4 and 5. Step 706 involves providing the delayed shutter timing pulse to the shutter driver (e.g., 122) to produce a shutter drive pulse that is used to shutter on the gated light detector (e.g., 128). Step 708 involves comparing an edge of the shutter drive pulse, produced by the shutter driver (e.g., 128), to a corresponding edge of the corresponding shutter reference pulse to produce a further binary edge comparison signal indicative of whether the edge of the shutter drive pulse lags or leads the corresponding edge of the corresponding shutter reference pulse. Step 708 can be performed by an edge comparator (e.g., 124), exemplary details of which were described above. Still referring to FIG. 7, step 710 involves adjusting the further variable delay in dependence on the further binary edge comparison signal. The line 712 indicates that steps 702, 704, 706, 708 and 710 are repeated over time, which has the effect of causing edges of further shutter drive pulses to substantially align with edges of further corresponding shutter references pulses. As explained above, step 708 can involve comparing leading edges of shutter drive pulses to leading edges of shutter reference pulses, or comparing trailing edges of shutter drive pulses to trailing edges of shutter reference pulses, or comparing both leading and trailing edges of shutter drive pulses to leading and trailing edges of shutter reference pulses. In other words, it can be the leading edges of shutter drive pulses, used to drive the gated light detector, that are aligned with the leading edges of the shutter reference pulses. Alternatively, it can be the trailing edges of shutter drive pulses, used to drive the gated light detector, that are aligned with the trailing edges of the shutter reference pulses. In still other embodiments, the leading and trailing edges of shutter drive pulses are aligned, respectively, with the leading and trailing edges of the shutter reference pulses.

Step 714 involves producing time-of-flight (TOF) measurements in dependence on detected pulses of light that are incident on gated light detector (e.g., 128) when it is shuttered on. In accordance with specific embodiments, the gated light detector (e.g., 128) includes an array of light sensitive pixels, which enables depth images to be produced in dependence on the TOF measurements.

In accordance with an embodiment, the steps described with reference to FIG. 7 are performed in parallel with the steps described with reference to FIG. 6.

As mentioned above, steps 604 and 704 can be implemented using electrically variable delays, exemplary details of which were described above with reference to FIGS. 4 and 5.

Certain embodiments described herein are directed to a system include a timing generator, a controller, an electrically variable delay, a light source driver and an edge comparator. The controller controls the timing generator to cause the timing generator to produce light timing pulses and corresponding light reference pulses, which have a specified fixed delay relative to the light timing pulses. The electrically variable delay receives the light timing pulses produced by the timing generator and outputs delayed light timing pulses. The light source driver produces light drive pulses in dependence on the delayed light timing pulses output by the electrically variable delay, wherein the delayed light timing pulses are used to drive a light source to cause the light source to selectively emit pulses of light. The edge comparator compares edges of the light drive pulses, produced by the light source driver, to corresponding edges of the corresponding light reference pulses to produce a binary edge comparison signal indicative of whether the edges of the light drive pulses lag or lead the corresponding edges of the corresponding light reference pulses. The electrically variable delay is adjusted over time, in dependence on the binary edge comparison signal produced by the edge comparator, to cause edges of light drive pulses, produced by the light source driver, to substantially align with corresponding edges of the corresponding light references pulses. In specific embodiments, the edge comparator comprises a D flip-flop including first input that accepts the light drive pulses, a second input that accepts the corresponding reference timing pulses, and an output at which the binary edge comparison signal is produced.

The system can also include a further electrically variable delay, a shutter driver and a further edge comparator. The controller also controls the timing generator to produce shutter timing pulses and corresponding shutter reference pulses, which have a further fixed delay relative to the shutter timing pulses. The further electrically variable delay receives the shutter timing pulses produced by the timing generator and outputs delayed shutter timing pulses. The shutter driver produces shutter drive pulses in dependence on the delayed shutter timing pulses output by the further electrically variable delay, wherein the shutter drive pulses are used to drive a gated light detector to cause the gate light detector to be selectively shuttered on. A further edge comparator compares edges of the shutter drive pulses, produced by the shutter driver, to corresponding edges of the corresponding shutter reference pulses to produce a further binary edge comparison signal indicative of whether the edges of the shutter drive pulses lag or lead the corresponding edges of the corresponding shutter reference pulses. The further electrically variable delay is adjusted over time to cause edges of shutter drive pulses, produced by the shutter driver, to substantially align with corresponding edges of the corresponding shutter references pulses.

In the above described embodiments, the electrically variable delay, the light source driver and the edge comparator collectively provide a delay locked loop (DLL). Similarly, the further electrically variable delay, the shutter driver and the further edge comparator collectively provide a further delay locked loop (DLL).

In accordance with certain embodiments, the controller, or a further controller, produces time-of-flight (TOF) measurements in dependence on detected pulses of light that are incident on the gated light detector while the gated light detector is shuttered on. In certain embodiments, the gated light detector includes an array of light sensitive pixels, each of which is used to produced TOF measurements. In such embodiments, the controller, or the further controller, can produce depth images in dependence on the TOF measurements.

In accordance with certain embodiments, the electrically variable delay comprises one or more ramp generators that generate one or more ramp signals in dependence on the light timing pulses. The electrically variable delay also includes circuitry that compares the one or more ramp signal to one or more threshold voltages, and that produces, in dependence on results of the comparisons, the delayed light timing pulses. Additionally, the electrically variable delay includes circuitry that adjusts the one or more threshold voltages, to which the one or more ramp signals is/are compared, in dependence on the binary edge comparison signal indicative of whether the edges of the light drive pulses lag or lead the corresponding edges of the corresponding light reference pulses. The further electrically variable delay can be implemented in the same or a similar manner.

In accordance with other embodiments, the electrically variable delay comprises one or more ramp generators that generate one or more ramp signals in dependence on the light timing pulses. The electorally variable delay also includes one or more logic gates, each of which has a corresponding threshold voltage, each of which receives one of the one or more ramp signals, and each of which is used to produce the delayed light timing pulses. Additionally, the electrically variable delay includes one or more bias adjustors each of which adjusts biasing one of the one or more ramp signals, in dependence on the binary edge comparison signal indicative of whether the edges of the light drive pulses lag or lead the corresponding edges of the corresponding light reference pulses, wherein the adjusting the biasing of the one or more ramp signals adjusts how long it takes for the one or more ramp signals to reach the corresponding threshold voltage(s) of the one or more logic gates used to produce the delayed light timing pulses. The further electrically variable delay can be implemented in the same or a similar manner.

A method according to certain embodiments of the present technology includes producing light timing pulses and corresponding light reference pulses, and producing shutter timing pulses and corresponding shutter reference pulses. The method further includes delaying the light timing pulses by a first variable delay to produce delayed light timing pulses, and delaying the shutter timing pulses by a second variable delay to produce delayed shutter timing pulses. The method also includes producing light drive pulses in dependence on the delayed light timing pulses, and producing shutter drive pulses in dependence on the delayed shutter timing pulses. Additionally, the method includes comparing edges of the light drive pulses to corresponding edges of the corresponding light reference pulses, and producing a first binary edge comparison signal indicative of whether the edges of the light drive pulses lag or lead the corresponding edges of the corresponding light reference pulses; and comparing edges of the shutter drive pulses to corresponding edges of the corresponding shutter reference pulses, and producing a second binary edge comparison signal indicative of whether the edges of the shutter drive pulses lag or lead the corresponding edges of the corresponding shutter reference pulses. The method further includes adjusting the first variable delay over time, in dependence on the first binary edge comparison signal, to cause edges of the light drive pulses to substantially align with corresponding edges of the corresponding light references pulses; and adjusting the second variable delay over time, in dependence on the second binary edge comparison signal, to cause edges of the shutter drive pulses to substantially align with corresponding edges of the corresponding shutter references pulses.

The above described method can also include driving a light source with the light drive pulses to thereby cause the light source to selectively emit pulses of light; and driving a gated light detector with the shutter drive pulses to thereby cause the gated light detector to selectively detect portions of the emitted pulses of light that have reflected off an object and are incident on the gated light detector. Time-of-flight (TOF) measurements can be produced in dependence on detected portions of the emitted pulses of light that have reflected off an object and are incident on the gated light detector. Such TOF measurements can be used to produce depth images.

In accordance with certain embodiments, the delaying the light timing pulses by the first variable delay to produce the delayed light timing pulses comprises generating one or more first ramp signals in dependence on the light timing pulses; and producing the delayed light timing pulses by providing the one or more first ramp signals to circuitry that compares the one or more first ramp signals to one or more corresponding threshold voltages, or to circuitry that biases the one or more ramp signals before the one or more ramp signals are provided to one or more logic gates each having a corresponding threshold voltage. In such embodiments, the adjusting the first variable delay, in dependence on the first binary edge comparison signal, can comprise adjusting the one or more threshold voltages to which the one or more first ramp signals is/are compared, or adjusting the biasing of the one or more ramp signals before the one or more ramp signals are provided to the one or more logic gates each having a corresponding threshold voltage.

Additional details of various systems and methods of the present technology can be appreciated from the above discussion of FIGS. 1-7.

Embodiments of the present invention can be used in a mobile device to determine distances between the mobile device and one or more objects and/or to produce depth images for use by the mobile device. The mobile device can be, e.g., a mobile phone, a robot, a vehicle, a drone, a portable computer or a mixed reality head mounted display (HMD), but is not limited thereto. Embodiments of the present invention can also be used in a gaming system or any other computing device to determine distances between the system/device and one or more objects and/or to produce depth images for use by the system/device.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. It is intended that the scope of the technology be defined by the claims appended hereto.

What is claimed is:

1. A method for use in a system that can produce time-of-flight (TOF) measurements, wherein the system includes a timing generator and a light source driver that selectively drives a light source to emit pulses of light which are used to produce the TOF measurements, the method comprising:
   (a) generating a light timing pulse and a corresponding a light reference pulse, which has a specified fixed delay relative to the light timing pulse, using the timing generator;
   (b) delaying the light timing pulse by a variable delay to produce a delayed light timing pulse;
   (c) providing the delayed light timing pulse to the light source driver to produce a light drive pulse that is used to drive the light source to cause the light source to emit a corresponding pulse of light;
   (d) comparing an edge of the light drive pulse, produced by the light source driver, to a corresponding edge of the corresponding light reference pulse to produce a binary edge comparison signal indicative of whether the edge of the light drive pulse lags or leads the corresponding edge of the corresponding light reference pulse;
   (e) adjusting the variable delay in dependence on the binary edge comparison signal; and
   repeating the (a) generating, the (b) delaying, the (c) providing, the (d) comparing and the (e) adjusting over time to cause edges of further instances of the light drive pulses to substantially align with edges of further instances of the corresponding light references pulses.

2. The method of claim 1, wherein the system also includes a shutter driver that selectively drives a gated light detector, the method further comprising:
   (f) generating a shutter timing pulse and a corresponding a shutter reference pulse, which has a further fixed delay relative to the shutter timing pulse, using the timing generator;
   (g) delaying the shutter timing pulse by a further variable delay to produce a delayed shutter timing pulse;
   (h) providing the delayed shutter timing pulse to the shutter driver to produce a shutter drive pulse that is used to drive the gated light detector to shutter on the gated light detector;
   (i) comparing an edge of the shutter drive pulse, produced by the shutter driver, to a corresponding edge of the corresponding shutter reference pulse to produce a further binary edge comparison signal indicative of whether the edge of the shutter drive pulse lags or leads the corresponding edge of the corresponding shutter reference pulse; and
   (j) adjusting the further variable delay in dependence on the further binary edge comparison signal; and
   repeating the (f) generating, the (g) delaying, the (h) providing, the (i) comparing and the (j) adjusting over time to cause edges of further instances of the delayed shutter timing pulses to substantially align with edges of further instances of the corresponding shutter references pulses.

3. The method of claim 2, wherein the (a) generating, the (b) delaying, the (c) providing, the (d) comparing and the (e) adjusting, which are used to control when the light source is driven to emit pulses of light, are performed in parallel with the (f) generating, the (g) delaying, the (h) providing, the (i) comparing and the (j) adjusting, which are used to control when the gated light detector is drive to be shuttered on.

4. The method of claim 2, further comprising producing TOF measurements in dependence on pulses of light that are incident on the gated light detector while the gated lighted detector is shuttered on.

5. The method of claim 4, wherein the gated light detector includes an array of light sensitive pixels, for each of which TOF measurements are produced, and wherein the method further comprises producing depth images in dependence on the TOF measurements.

6. The method of claim 2, wherein:
   the (b) delaying the light timing pulses by the variable delay to produce the delayed light timing pulses comprises
      generating one or more ramp signals in dependence on the light timing pulses;
      comparing each of the one or more ramp signals to a corresponding threshold voltage of one or more threshold voltages; and
      producing the delayed light timing pulses in dependence on results of the comparing; and the (e) adjusting the variable delay comprises adjusting the one or more threshold voltages, to which the one or more ramp signals is/are compared, in dependence on the binary edge comparison signal indicative of whether the edges of the light drive pulses lag or lead the corresponding edges of the corresponding light reference pulses;

the (g) delaying the shutter timing pulses by the further variable delay to produce the delayed shutter timing pulses comprises generating one or more further ramp signals in dependence on the shutter timing pulses;

comparing each of the one or more further ramp signals to a corresponding threshold voltage of the one or more threshold voltages; and producing the delayed shutter timing pulses in dependence on results of the comparing; and the (j) adjusting the further variable delay comprises adjusting the one or more threshold voltages, to which the one or more further ramp signals is/are compared, in dependence on the further binary edge comparison signal indicative of whether the edges of the shutter drive pulses lag or lead the corresponding edges of the corresponding shutter reference pulses.

7. The method of claim 2, wherein:

the (b) delaying the light timing pulses by the variable delay to produce the delayed light timing pulses comprises generating one or more ramp signals in dependence on the light timing pulses;

providing the one or more ramp signals to one or more logic gates each of which has a corresponding threshold voltage; and using the one or more logic gates to produce the delayed light timing pulses; and the (e) adjusting the variable delay comprises adjusting biasing of the one or more ramp signals, in dependence on the binary edge comparison signal indicative of whether the edges of the light drive pulses lag or lead the corresponding edges of the corresponding light reference pulses, wherein the adjusting the biasing of the one or more ramp signal adjusts how long it takes for the one or more ramp signals to reach the corresponding threshold voltage(s) of the one or more logic gates used to produce the delayed light timing pulses;

the (g) delaying the shutter timing pulses by the further variable delay to produce the delayed shutter timing pulses comprises generating one or more further ramp signals in dependence on the shutter timing pulses;

providing the one or more further ramp signals to one or more further logic gates each of which has a corresponding threshold voltage; and using the one or more further logic gates to produce the delayed shutter timing pulses; and the (j) adjusting the further variable delay comprises adjusting biasing of the one or more further ramp signals, in dependence on the further binary edge comparison signal indicative of whether the edges of the shutter drive pulses lag or lead the corresponding edges of the corresponding shutter reference pulses, wherein the adjusting the biasing of the one or more further ramp signal adjusts how long it takes for the one or more further ramp signals to reach the corresponding threshold voltage(s) of the one or more further logic gates used to produce the delayed shutter timing pulses.

8. The method of claim 1, wherein:

the (b) delaying the light timing pulses by the variable delay is performed using an electrically variable delay;

the (c) comparing is performed using an edge comparator.

9. A system, comprising:

a timing generator;

a controller that controls the timing generator to cause the timing generator to produce light timing pulses and corresponding light reference pulses, which have a specified fixed delay relative to the light timing pulses;

an electrically variable delay that receives the light timing pulses produced by the timing generator and outputs delayed light timing pulses;

a light source driver that produces light drive pulses in dependence on the delayed light timing pulses output by the electrically variable delay, the delayed light timing pulses used to drive a light source to cause the light source to selectively emit pulses of light; and an edge comparator that compares edges of the light drive pulses, produced by the light source driver, to corresponding edges of the corresponding light reference pulses to produce a binary edge comparison signal indicative of whether the edges of the light drive pulses lag or lead the corresponding edges of the corresponding light reference pulses;

wherein the electrically variable delay is adjusted over time, in dependence on the binary edge comparison signal produced by the edge comparator, to cause edges of light drive pulses, produced by the light source driver, to substantially align with corresponding edges of the corresponding light references pulses.

10. The system of claim 9, wherein the controller also controls the timing generator to produce shutter timing pulses and corresponding shutter reference pulses, which have a further fixed delay relative to the shutter timing pulses, and wherein the system further comprises:

a further electrically variable delay that receives the shutter timing pulses produced by the timing generator and outputs delayed shutter timing pulses;

a shutter driver that produces shutter drive pulses in dependence on the delayed shutter timing pulses output by the further electrically variable delay, the shutter drive pulses used to drive a gated light detector to cause the gated light detector to be selectively shuttered on; and a further edge comparator that compares edges of the shutter drive pulses, produced by the shutter driver, to corresponding edges of the corresponding shutter reference pulses to produce a further binary edge comparison signal indicative of whether the edges of the shutter drive pulses lag or lead the corresponding edges of the corresponding shutter reference pulses;

wherein the further electrically variable delay is adjusted over time to cause edges of shutter drive pulses, produced by the shutter driver, to substantially align with corresponding edges of the corresponding shutter references pulses.

11. The system of claim 10, wherein:

the electrically variable delay, the light source driver and the edge comparator collectively provide a delay locked loop (DLL); and the further electrically variable delay, the shutter driver and the further edge comparator collectively provide a further delay locked loop (DLL).

12. The system of claim 10, wherein the controller, or a further controller, produces time-of-flight (TOF) measurements in dependence on detected pulses of light that are incident on the gated light detector while the gated light detector is shuttered on.

13. The system of claim 12, wherein the gated light detector includes an array of light sensitive pixels, for each of which TOF measurements are produced, and wherein the controller, or a further controller, produces depth images in dependence on the TOF measurements.

14. The system of claim 9, wherein the edge comparator comprises a D flip-flop including a first input that accepts the light drive pulses, a second input that accepts the corresponding reference timing pulses, and an output at which the binary edge comparison signal is produced.

15. The system of claim 9, wherein the electrically variable delay comprises:
   one or more ramp generators that generate one or more ramp signals in dependence on the light timing pulses;
   circuitry that compares the one or more ramp signal to one or more threshold voltages, and that produces, in dependence on results of the comparisons, the delayed light timing pulses; and
   circuitry that adjusts the one or more threshold voltages, to which the one or more ramp signals is/are compared, in dependence on the binary edge comparison signal indicative of whether the edges of the light drive pulses lag or lead the corresponding edges of the corresponding light reference pulses.

16. The system of claim 9, wherein the electrically variable delay comprises:
   one or more ramp generators that generate one or more ramp signals in dependence on the light timing pulses;
   one or more logic gates each of which has a corresponding threshold voltage, each of which receives one of the one or more ramp signals, and each of which is used to produce the delayed light timing pulses; and
   one or more bias adjustors each of which adjusts biasing of one of the one or more ramp signals, in dependence on the binary edge comparison signal indicative of whether the edges of the light drive pulses lag or lead the corresponding edges of the corresponding light reference pulses, wherein the adjusting the biasing of the one or more ramp signal adjusts how long it takes for the one or more ramp signals to reach the corresponding threshold voltage(s) of the one or more logic gates used to produce the delayed light timing pulses.

17. A method, comprising:
   producing light timing pulses and corresponding light reference pulses;
   producing shutter timing pulses and corresponding shutter reference pulses;
   delaying the light timing pulses by a first variable delay to produce delayed light timing pulses;
   delaying the shutter timing pulses by a second variable delay to produce delayed shutter timing pulses;
   producing light drive pulses in dependence on the delayed light timing pulses;
   producing shutter drive pulses in dependence on the delayed shutter timing pulses;
   comparing edges of the light drive pulses to corresponding edges of the corresponding light reference pulses;
   producing a first binary edge comparison signal indicative of whether the edges of the light drive pulses lag or lead the corresponding edges of the corresponding light reference pulses;
   comparing edges of the shutter drive pulses to corresponding edges of the corresponding shutter reference pulses;
   producing a second binary edge comparison signal indicative of whether the edges of the shutter drive pulses lag or lead the corresponding edges of the corresponding shutter reference pulses;
   adjusting the first variable delay over time, in dependence on the first binary edge comparison signal, to cause edges of further instances of the light drive pulses to substantially align with corresponding edges of further instances of the corresponding light references pulses; and
   adjusting the second variable delay over time, in dependence on the second binary edge comparison signal, to cause edges of further instances of the shutter drive pulses to substantially align with corresponding edges of further instances of the corresponding shutter references pulses.

18. The method of claim 17, further comprising:
   driving a light source with the light drive pulses to thereby cause the light source to selectively emit pulses of light; and
   driving a gated light detector with the shutter drive pulses to thereby cause the gated light detector to selectively detect portions of the emitted pulses of light that have reflected off an object and are incident on the gated light detector.

19. The method of claim 18, further comprising:
   producing time-of-flight (TOF) measurements in dependence on detected portions of the emitted pulses of light that have reflected off an object and are incident on the gated light detector.

20. The method of claim 17, wherein:
   the delaying the light timing pulses by the first variable delay to produce the delayed light timing pulses comprises
      generating one or more ramp signals in dependence on the light timing pulses; and
      producing the delayed light timing pulses by providing the one or more first ramp signals to circuitry that compares the one or more first ramp signals to one or more corresponding threshold voltages, or to circuitry that biases the one or more ramp signals before the one or more ramp signals are provided to one or more logic gates each having a corresponding threshold voltage; and
   the adjusting the first variable delay, in dependence on the first binary edge comparison signal, comprises adjusting the one or more threshold voltages to which the one or more ramp signals is/are compared, or adjusting the biasing of the one or more ramp signals before the one or more ramp signals is/are provided to the one or more logic gates each having a corresponding threshold voltage.

* * * * *